United States Patent
Dicker et al.

(10) Patent No.: US 9,390,186 B2
(45) Date of Patent: *Jul. 12, 2016

(54) ADAPTIVE LEARNING METHODS FOR SELECTING PAGE COMPONENTS TO INCLUDE ON DYNAMICALLY GENERATED PAGES

(71) Applicant: Amazon Technologies, Inc., Seattle, WA (US)

(72) Inventors: Russell A. Dicker, Seattle, WA (US); Robert G. Cottrell, Seattle, WA (US); Jeremy C. York, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,895

(22) Filed: Jul. 1, 2015

(65) Prior Publication Data

US 2015/0302105 A1 Oct. 22, 2015

Related U.S. Application Data

(63) Continuation of application No. 14/598,718, filed on Jan. 16, 2015, now Pat. No. 9,135,359, which is a continuation of application No. 10/393,505, filed on Mar. 19, 2003, now Pat. No. 8,965,998.

(60) Provisional application No. 60/366,343, filed on Mar. 19, 2002.

(51) Int. Cl.
*G06F 17/30* (2006.01)
*G06N 99/00* (2010.01)
*G06Q 30/06* (2012.01)

(52) U.S. Cl.
CPC ...... *G06F 17/30876* (2013.01); *G06F 17/3089* (2013.01); *G06N 99/005* (2013.01); *G06Q 30/0633* (2013.01)

(58) Field of Classification Search
CPC .................................. G06F 17/30876
See application file for complete search history.

(56) References Cited

U.S. PATENT DOCUMENTS

| | | | |
|---|---|---|---|
| 5,446,891 A | 8/1995 | Kaplan et al. | |
| 5,774,123 A | 6/1998 | Matson | |
| 5,848,396 A | 12/1998 | Gerace | |
| 5,870,559 A | 2/1999 | Leshem et al. | |
| 5,958,008 A * | 9/1999 | Pogrebisky | G06F 11/32 707/E17.116 |
| 6,012,051 A | 1/2000 | Sammon, Jr. et al. | |
| 6,085,229 A | 7/2000 | Newman et al. | |

(Continued)

OTHER PUBLICATIONS

Mobasher, B., Cooley, R., and Srivastava, J., "Automatic Personalization Based on Web Usage Mining," Communications of the ACM, vol. 43, No. 8, dated Aug. 2000 (of-record in parent application).

(Continued)

*Primary Examiner* — Asghar Bilgrami
(74) *Attorney, Agent, or Firm* — Knobbe, Martens, Olson & Bear LLP

(57) ABSTRACT

A subset of a set of components is selected for inclusion on a dynamically-generated page within a particular user context. The subset of components is selected based on scores associated with the components in the set. The score of a component is preferably determined based on measurements of user activity resulting from exposures of the components to users in the particular context.

19 Claims, 9 Drawing Sheets

(56) References Cited

U.S. PATENT DOCUMENTS

| | | | |
|---|---|---|---|
| 6,317,722 | B1 | 11/2001 | Jacobi et al. |
| 6,466,970 | B1 | 10/2002 | Lee et al. |
| 6,473,794 | B1 | 10/2002 | Guheen et al. |
| 6,493,702 | B1 | 12/2002 | Adar et al. |
| 6,606,102 | B1 | 8/2003 | Odom |
| 6,629,079 | B1 | 9/2003 | Spiegel et al. |
| 6,636,836 | B1 | 10/2003 | Pyo |
| 6,658,568 | B1 | 12/2003 | Ginter et al. |
| 6,735,572 | B2 | 5/2004 | Landesmann |
| 6,873,967 | B1 | 3/2005 | Kalagnanam et al. |
| 6,901,378 | B1 | 5/2005 | Linker et al. |
| 7,016,864 | B1 | 3/2006 | Notz et al. |
| 7,031,961 | B2 | 4/2006 | Pitkow et al. |
| 7,089,237 | B2 | 8/2006 | Turnbull et al. |
| 7,295,995 | B1 | 11/2007 | York et al. |
| 7,720,723 | B2 | 5/2010 | Dicker et al. |
| 8,965,998 | B1 | 2/2015 | Dicker et al. |
| 2001/0011235 | A1 | 8/2001 | Kim et al. |
| 2001/0014868 | A1* | 8/2001 | Herz .............. G06Q 10/0637 705/14.38 |
| 2002/0046099 | A1* | 4/2002 | Frengut .............. G06Q 30/02 705/14.52 |
| 2002/0082923 | A1 | 6/2002 | Merriman et al. |
| 2002/0143813 | A1* | 10/2002 | Jellum .............. G06F 17/3089 715/234 |
| 2002/0198882 | A1 | 12/2002 | Linden et al. |
| 2003/0004781 | A1 | 1/2003 | Mallon et al. |
| 2003/0074252 | A1 | 4/2003 | Chandler-Pepelnjak et al. |
| 2003/0105682 | A1 | 6/2003 | Dicker et al. |
| 2015/0134478 | A1 | 5/2015 | Dicker et al. |

OTHER PUBLICATIONS

Yu, K., Xu, Xiaowei, Ester, M., and Kriegel, H., "Selecting Relevant Instances for Efficient and Accurate Collaborative Filtering," ACM Press, Proceedings of the Tenth International Conference on Information and Knowledge Management, Atlanta, Georgia, pp. 239-246 (2001) (of-record in parent application).

Widyantoro, D., Loerger, T., and Yen, J., "An Adaptive Algorithm for Learning Changes in User Interests," ACM Press, Proceedings of the Eighth International Conference on Information Knowledge Management, Kansas City Missouri, pp. 405-412 (1999) (of-record in parent application).

Schwab, Pohl and Koychev, "Learning to Recommend from Positive Evidence," ACM Press, Proceedings of the 2000 International Conference on Intelligent User Interfaces, New Orleans, Louisiana, pp. 241-247 (2000) (of-record in parent application).

Middleton, S., De Roure, D., and Shadbolt N., "Capturing Knowledge of User Preferences: Ontologies in Recommender Systems," ACM Press, Proceedings of the International Conference on Knowledge Capture, Victoria British Columbia, Canada, pp. 100-107 (2001) (of-record in parent application).

Anderson, C., Domingos, P., and Weld, D., "Personalizing Web Sites for Mobile Users," ACM Press, The Tenth International World Wide Web Conference on World Wide Web, pp. 565-575 (2001) (of-record in parent application).

VanderMeer, D., Dutta, K., Datta, A., Ramamritham, K., and Navanthe, S., "Enabling Scalable Online Personalization on the Web," ACM Press, Proceedings of the 2nd ACM Conference on Electronic Commerce, pp. 185-196 (2000) (of-record in parent application).

Rossi, G., Schwabe, D., and Guimaraes, R., "Designing Personalized Web Applications," ACM Press, The Tenth International World Wide Web Conference on World Wide Web, pp. 275-284 (2001) (of-record in parent application).

Langheinrich, M., Nakamura, A., Abe, N., Kamba, T., and Koseki, Y., "Unintrusive Customization Techniques for Web Advertising," pp. 1-19, printed on Feb. 1, 2002 from http://wwww8.org/w8papers/2b-customizing/unintrusive/unintrusive.html (of-record in parent application).

* cited by examiner

ADAPTIVE LEARNING METHODS FOR SELECTING PAGE COMPONENTS TO INCLUDE ON DYNAMICALLY GENERATED PAGES

RELATED APPLICATIONS

This application is a continuation of U.S. application Ser. No. 14/598,718, filed Jan. 16, 2015, which is a continuation of U.S. application Ser. No. 10/393,505, filed Mar. 19, 2003 (now U.S. Pat. No. 8,965,998), which claims the benefit of U.S. Provisional Appl. No. 60/366,343, filed Mar. 19, 2002. The disclosures of the aforesaid applications are hereby incorporated by reference.

BACKGROUND OF THE INVENTION

1. Field of the Invention

The present invention relates to the use of machine learning methods for identifying web page content that is most likely to produce a desired user action when incorporated into a dynamically-generated web page.

2. Description of the Related Art

Many web sites serve web pages that include one or more web page components (hereinafter referred to as "components"). A given component may, for example, contain content generated by a particular code module or service, and may occupy a particular area or section of a web page. Typically, the components contain links, buttons or other controls for allowing users to perform specific actions, such as adding a displayed item to a shopping cart.

In selecting components to be incorporated into a web page, the web site operator typically wants to present the most effective set of components to the user. The effectiveness of presenting a component can be a measure of whether a desired result is obtained from the user and/or whether a desired action is performed by the user. The desired actions or results can be any action or result an operator of a web site might want to obtain from a user. For example, desired actions for an advertiser-supported on-line content provider might be, for example, the selection of a banner advertisement by a user or selection of a hypertext link to another page of the web site on which additional banner advertisements are displayed.

In accordance with existing techniques, in order to determine the effectiveness of presenting a component to a user, web site operators manually set up tests in which components are presented to users and activity resulting from presenting the components is tracked. The tracked activity can include any user activity of interest resulting from presenting the component to a user, such as a selection of a hypertext link included in the component, or an addition of a product displayed or represented by the component to a shopping cart or a wish list. The tests are typically conducted in such a way that users are not aware that they are the subject of a test of the effectiveness of a component. Based upon analysis of the resulting activity, the effectiveness of components can be determined. Determinations as to which components to present to users can then be based upon the determined effectiveness of the tested components.

The use of manual tests in determining the effectiveness of components has several drawbacks. Conducting manual tests in order to determine the effectiveness of components is very labor intensive. Due to this labor intensive nature, the number of tests and the level of detail of the tests are limited by available manpower. In addition, these tests typically also do not take into consideration differing tastes or preferences among numerous particular types or classes of users. Manual tests also typically have a finite duration so that new tests must be conducted as new components are introduced and user trends change. Furthermore, once the results of a test are obtained, human intervention is typically required in order to propagate the results into a change in components that are displayed. The present invention seeks to address these deficiencies, among others.

SUMMARY

In accordance with one embodiment, an adaptive process uses collected activity data to select a subset of components from a set of components for incorporation in a web page. The set of components, the details of the selection process, the activity data and the web page are preferably associated with a context representing a state of a user and/or a user browsing session.

Preferably, different components are repeatedly exposed to users and user activity associated with each of the components is measured in association with a context. Activity data for a component accounts for measured user actions that have resulted from previously exposing (presenting) the component to users within the context. The activity data accumulated in association with the context is then used to select components that are likely to be most effective within the context (e.g., most likely to be of interest to the user or to most likely generate a desired response from the user) for inclusion in dynamically generated web pages.

The context associated with a particular dynamically-generated web page may optionally reflect the browsing and/or purchase histories of users of a web site, such that components presented on that web page over the same time period vary from user to user. For example, if the current visitor to the web page is a frequent customer of the web site, a component may automatically be selected that has frequently produced a desirable result (e.g., an item purchase) when presented to other frequent customers on that web page. On the other hand, new customers who access the same web page may be presented with a different component—one that has been particularly effective when presented to new customers.

Each component may, for example, be in the form of content generated by a particular code module or service. For instance, if the web page being populated is a shopping cart page, one component may provide personalized product recommendations based on the current contents of the user's shopping cart; another component may display a set of products that are similar or related to a product just added to the shopping cart. Different modules can be invoked to provide different types of components for inclusion on a web page. As will be understood by one skilled in the art, modules that provide or generate components can be selected in a manner that has the same effect as selecting components. Accordingly, for the sake of simplifying the present disclosure, the invention should be understood to apply to the selection of modules as well as to the selection of components themselves.

In accordance with one embodiment, a system is configured to select subsets of components for inclusion in web pages. By repeatedly selecting and including components in web pages served in response to user requests, the system also exposes components to users. As components are repeatedly exposed to users, the system detects and measures user activity resulting from component exposures.

In accordance with one embodiment, a method for selecting components from a set utilizes activity and exposure values collected in association with prior user activity in a context. For each component in the context, the number of times the component is exposed to users is counted. In addition, the number of user actions of interest associated with exposures of each component is counted and optionally weighted in determining an activity value. A score is determined for each component preferably by dividing the activity value by the number of exposures. A subset of components is selected from the set by selecting a desired number of components with the highest scores. Preferably, within each context, the subsets of selected components are randomly varied to some extent such that most or all of the components in the set are exposed at least a certain number of times.

In certain embodiments, multiple contexts are used. Preferably, a context is identified through one or more attributes or values descriptive of a user and/or a user browsing session. In accordance with one embodiment, the web server system maintains a set of state variables for each user and/or the user's browsing session. Prior to selecting a subset of components to present to the user, the system identifies a context by matching current state values for the user to all of the applicable attribute values for a context. Preferably, context attributes are selected such that only one context will match any set of state variable values. Example state variables might include, for example: (a) a variable configured to identify a category of a product that was last added to the user's electronic shopping cart, (b) a boolean indication as to whether the user's electronic shopping cart contains gift components, and (c) a web page identifier that identifies the web page or type of web page the user is browsing. A particular context might have attributes requiring that the values of these variables be respectively: (a) "GARDENING," (b) "NO," and (c) "SHOPPING CART PAGE." If the values of a user's state variables match these context attributes, then the applicable context has been identified and a subset of components can be selected in accordance with the available set of components, activity data, and process associated with the context.

The present invention may also be used to select items, such as products, to suggest to users within specific contexts that are dependent upon user-specific data.

DETAILED DESCRIPTION OF THE EMBODIMENTS

Figure 1A:
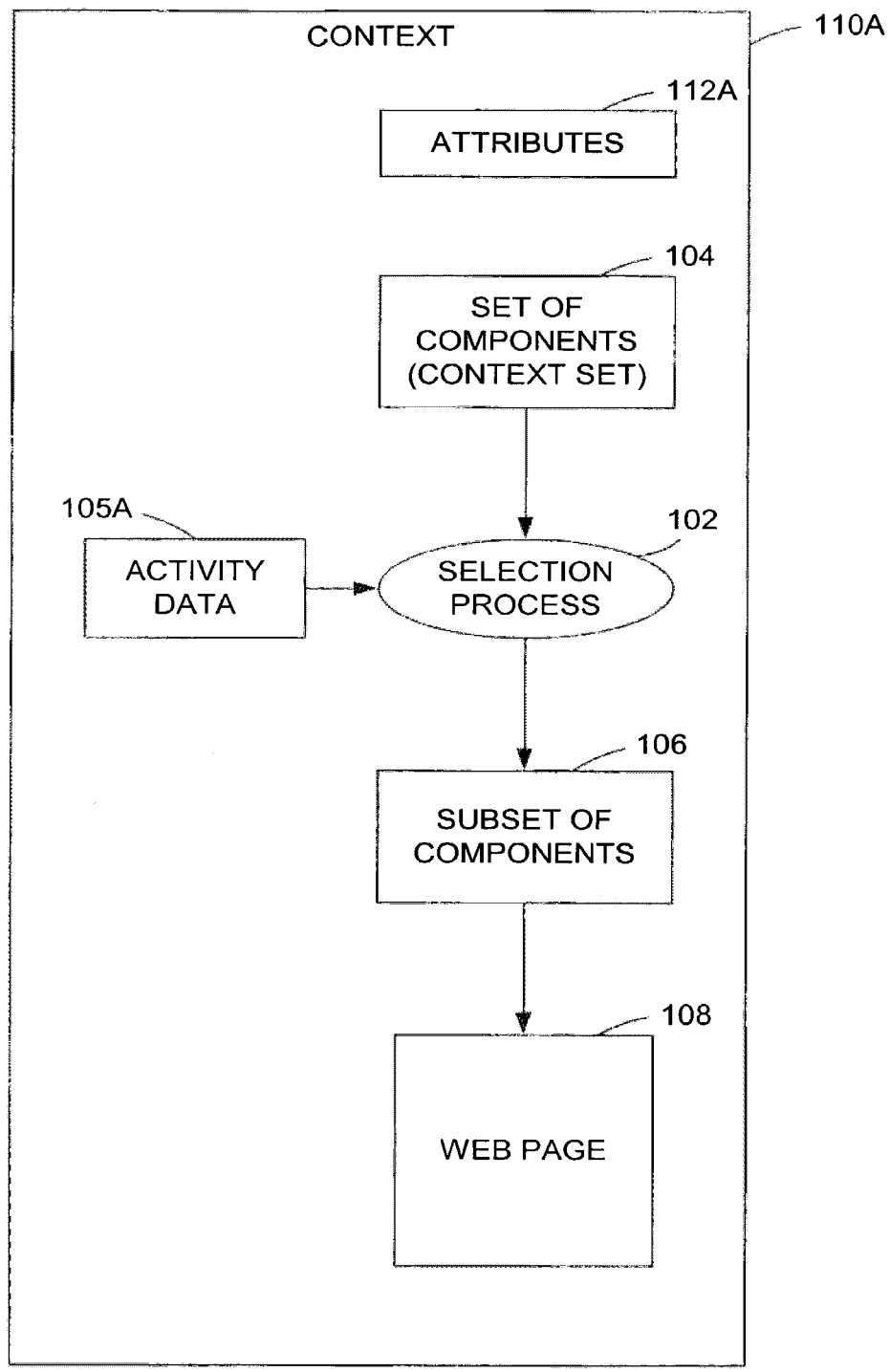
FIG. 1A illustrates an adaptive process for selecting components in accordance with one embodiment of the invention.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices, components, and methods to those described herein. In other instances, well-known devices, components, and methods have not been described in detail so as not to unnecessarily obscure aspects of the present invention.

I. PREFACE

A. Contexts

In accordance with one embodiment, a context defines an environment in association with which data is collected and in association with which components are selected for inclusion on web pages based upon the collected data. A context can be identified or defined through one or more attributes or values descriptive of, related to, and/or identifying, for example, (a) a user, and/or (b) a state of a user's browsing session. The attributes can be web browsing session specific values, such as the location of the current web page the user is requesting or the locations of one or more previous web pages requested by the user. The attributes can also be non-session specific values such as the identity of a user, what the user has in an electronic shopping cart, the past purchase history of the user, or how long the user has been a customer of an on-line merchant.

B. Static and Dynamically Generated Web Pages

Web pages can be static or dynamically generated. Static web pages are authored, created, or generated off-line and stored in a file system in advance of a web page request. Upon receipt of a web page request, the web page is read from the file system and served. Dynamically generated web pages are generated on-the-fly by a program, script or module in response to a web page request.

A dynamically generated web page is typically based upon a web page template or script, which is interpreted to generate the web page. The template includes code that specifies the structure of the web page and other aspects of the web page that do not change between requested instances of the dynamically generated page. The interpretation of the web page template, however, can produce a web page with different content or data, depending upon user or system variables at the time the page is generated. Accordingly, dynamically generated web pages facilitate web page personalization, web page customization, and user interactivity through web pages.

In accordance with a preferred embodiment, components are selected for inclusion in dynamically generated web pages. The components can be selected dynamically, in response to a request for the web page, or the components can be selected off-line, in advance of a request for the web page.

II. OVERVIEW

A. Processes for Selecting Components

FIG. 1A illustrates an adaptive process for selecting components in accordance with one embodiment of the invention. As illustrated, a selection process 102 operates on a set of components 104 using activity data 105A associated with the components to produce a subset of components 106. The subset of components 106 is then incorporated into a web page 108 that is served to a user. Activity data 105A for a component preferably includes data related to prior user actions resulting from presenting the component to users. The selection process 102 and the activity data 105A will be described in detail in the next section.

The set of components 104, the details of the selection process 102, the activity data 105A, the subset of components 106, and the web page 108 are preferably associated with a context 110A. The context 110A is preferably identified through a set of attributes 112A. For any context 110A, the set of components 104 associated with the context may be referred to as a "context set."

Figure 1B:
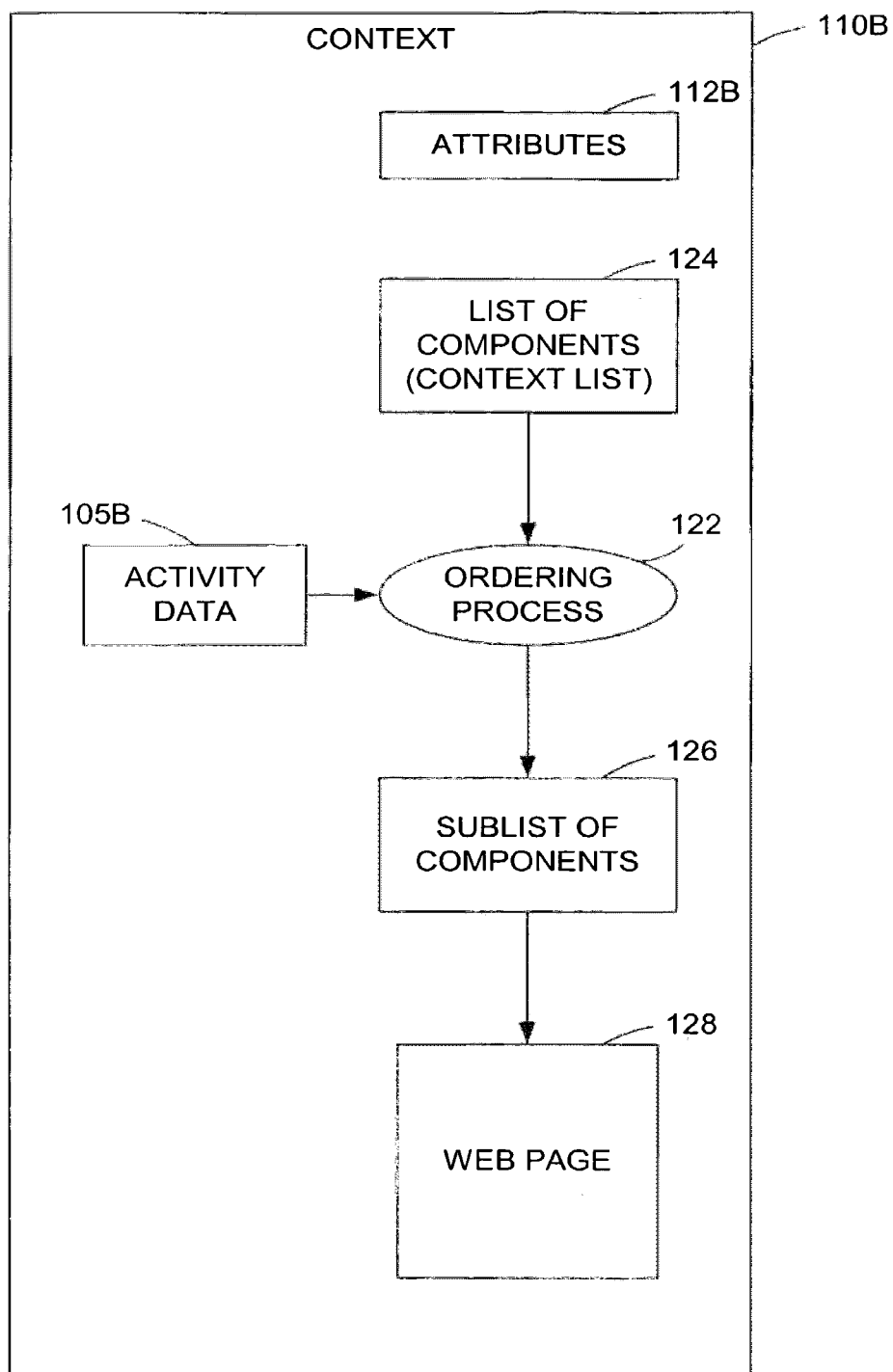
FIG. 1B illustrates an adaptive process for selecting components in accordance with another embodiment of the invention.

FIG. 1B illustrates an adaptive process for selecting components in accordance with another embodiment of the invention. As illustrated, an ordering process 122 operates on a list of components 124 using activity data 105B associated with the components to produce a sublist of components 126. The sublist of components 126 is then incorporated into a web page 128 that is served to a user. The ordering process 122 will be described in detail in the next section in conjunction with the selection process 102.

The list of components 124, the details of the ordering process 122, the activity data 105B, the sublist of components 126, and the web page 128 are preferably associated with a context 110B. The context 110B is preferably identified, characterized and/or defined by a set of attributes 112B. For any context 110B, the list of components 124 associated with the context may be referred to as a "context list."

As will be understood by one skilled in the art, a list is an ordered set. Accordingly, for the sake of simplifying the present disclosure, references to sets should, as the context of the disclosure permits, be interpreted as also applying to lists and vice versa.

B. Multiple Contexts

Many different contexts may be defined and used to populate dynamically-generated web pages of a given web site. For example, one context can be used to select components for a web page suggesting gifts for men at a merchant web site and another context can be used to select components for a web page suggesting gifts for women at the site. For each context, subsets of components (each component configured to show one or more gifts) are selected from a context set of available components using a process 102 configured for the context. As will be discussed in greater detail in the next section, the process 102 preferably uses activity data 105 collected in association with the context in selecting the subsets.

In one embodiment, each of two or more contexts is configured to use the same context set of components. The process 102 can be relied upon to select subsets of components that will likely be of interest in each context based upon prior user activity monitored in each context. In another embodiment, each of context can be configured to use a separate context list.

In certain embodiments, each of two or more contexts is configured to use the same process 102, such as the same set of calculations, for selecting subsets. In this case, different subsets of selected components can result from the use of different context sets and/or from the use of different data collected in association with the different contexts.

In certain embodiments, each of two or more contexts are configured to use the same activity data 105 for selecting subsets. In this case, different subsets of selected components can result from the use of different processes 102 in selecting subsets or from the use of different context sets 104 of components from which the subsets are selected.

In certain embodiments, only a single context might be used. As will be understood by one skilled in the art, when only a single context is used, no differentiation between multiple contexts is necessary and therefore contexts need not be used at all.

III. Example Web Pages and Contexts

A. Merchant Home Page

Figure 2:
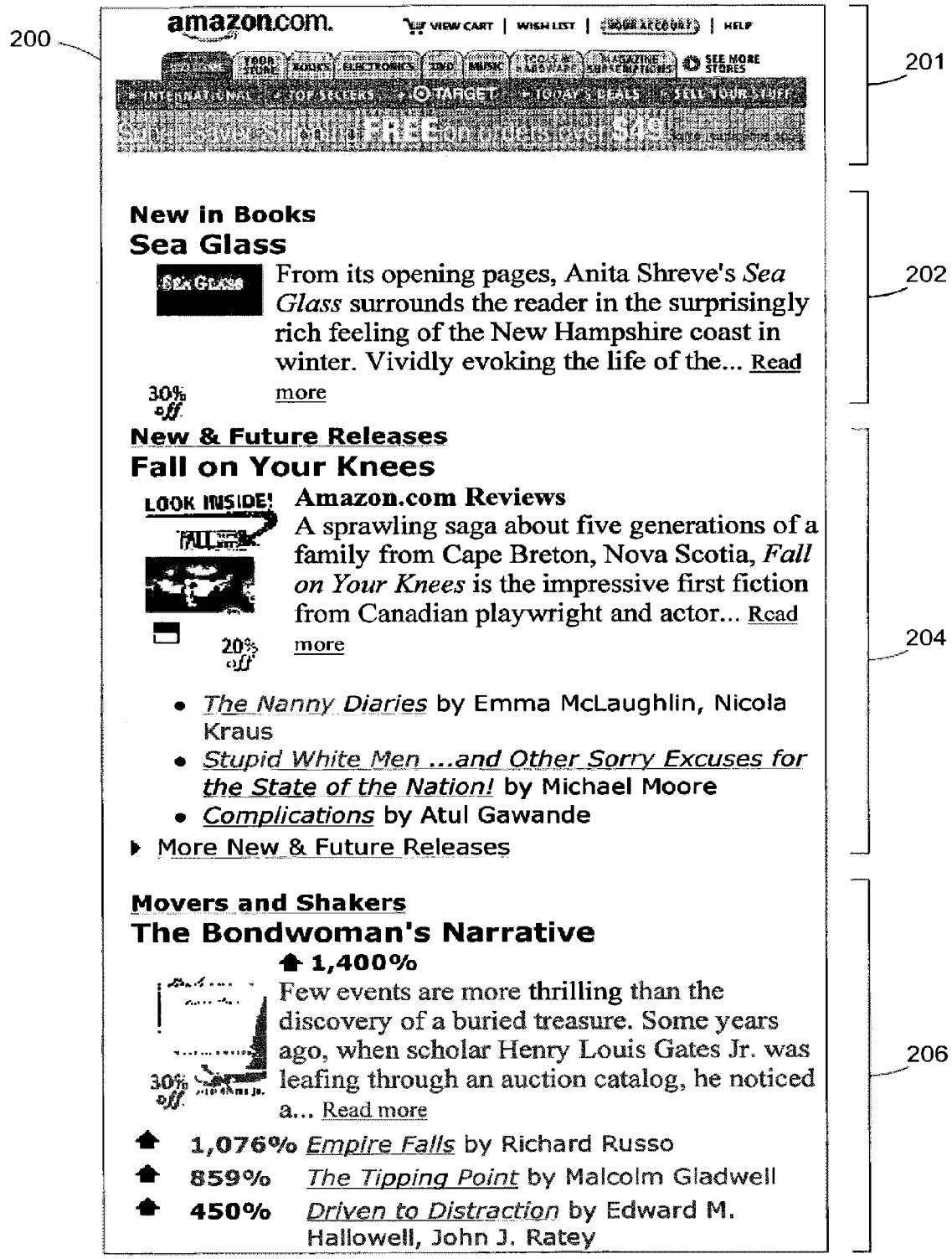
FIG. 2 illustrates an example web page in accordance with one embodiment.

FIG. 2 illustrates an example home page 200 for a merchant web site. The web page 200 includes a first component 201 that shows the name of the merchant and provides a navigation bar that users can use to move about the merchant's web site. Preferably this first component 201 is included each time the web page 200 is served.

The illustrated web page 200 includes three additional components 202, 204, and 206 titled respectively:
"New in Books" (showing a single new book product)
"New & Future Releases" (showing a number of new and future releases)
"Movers and Shakers" (showing products that have recently increased in popularity, including the corresponding increases)

In accordance with one embodiment, the components 202, 204, and 206 are selected from a larger set of possible components. The larger set of components might include, for example, the additional components:
"Best Sellers"
"Discount Items"
"Recommendations" (can be tailored specifically for the user, based upon the user profile)

In one embodiment, the web page 200 and the set of possible components are associated with a single context. The context can include a single attribute, such as, for example, the value of the path of this web page in the web site hosting the page:
web page identifier: /homepage.html
Alternatively, two or more contexts can be used for selecting components for the web page 200 by using attributes that may depend upon the identity of the user. For example, a first context can include the following attributes:
web page identifier: /homepage.html
last purchase >1 year ago: Y
A second context can include the following attributes:
web page identifier: /homepage.html
last purchase >1 year ago: N
Any number of contexts can be configured to be used in conjunction with a web page. Different contexts can be associated with different user characteristics (e.g., new user, frequent purchaser, electronics buff) or other variables, such as, for example, time of day (e.g., morning, afternoon, evening), or time of year (e.g., summer, winter, Christmas).

B. Electronic Shopping Cart Page

Figure 3:
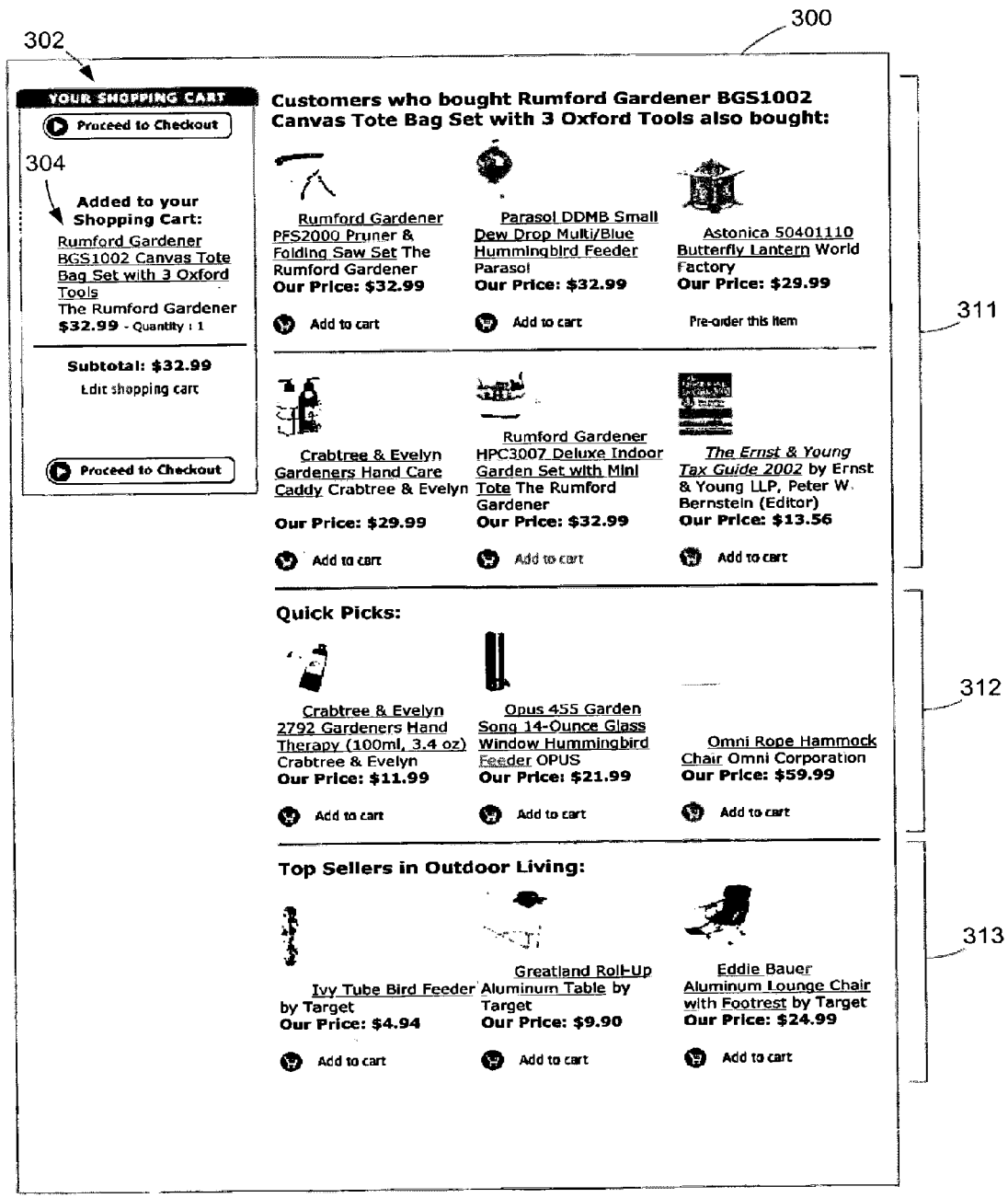
FIG. 3 illustrates an example web page in accordance with another embodiment.

FIG. 3 illustrates another example web page 300 from a merchant web site. On the left, the web page 300 shows an electronic shopping cart 302 to which one selection 304 has been added. To the right of the shopping cart 302, the web page shows several components. The components of interest in this case are the three components of the web page 311-313 titled:

"Customers who bought [the product added to the shopping cart] also bought:"
"Quick Picks:"
"Top sellers in [the category of the product added to the shopping cart]:"

In this case, each of the components 311-313 identifies different types of products that the user might be interested in purchasing.

Although only three components 311-313 are shown in the web page 300, these three components have preferably been selected from a set including several other components such as:

"Customers who shopped for [the product added to the shopping cart] also shopped for:"
"Customers who shopped for [the product added to the shopping cart] also shopped for:" but configured to display only products in a similar product category (e.g., gardening)
"Customers who bought [the product added to the shopping cart] also bought:" but configured to display only products in a different product category (e.g., books)
"Recently viewed items:"
"Items on your wish list:"
"Items on [your friend's] wish list:"
"Accessories [for the product added to the shopping cart]:"
"Shopping Cart Based Recommendations:" where the recommendations are determined based upon the contents of the shopping cart
"Purchase History Based Recommendations:" where the recommendations are determined based upon the user's past purchases
"Session-Based Recommendations:" where the recommendations are determined based upon the products viewed by the user during the current browsing session Related to the above-referenced component titled "Customers who bought [the product added to the shopping cart] also bought:" is U.S. Pat. No. 6,317,722, which discloses methods that can be used to select products to recommend based upon the contents of a user's shopping cart. Related to the above-referenced components titled "Customers who shopped for . . . " is U.S. patent application Ser. No. 09/821, 826, filed Mar. 29, 2001, to Linden, Smith and Zada, which is assigned to the assignee of the present application and which is incorporated herein in its entirety by reference.

IV. SYSTEM AND METHODS

Figure 4:
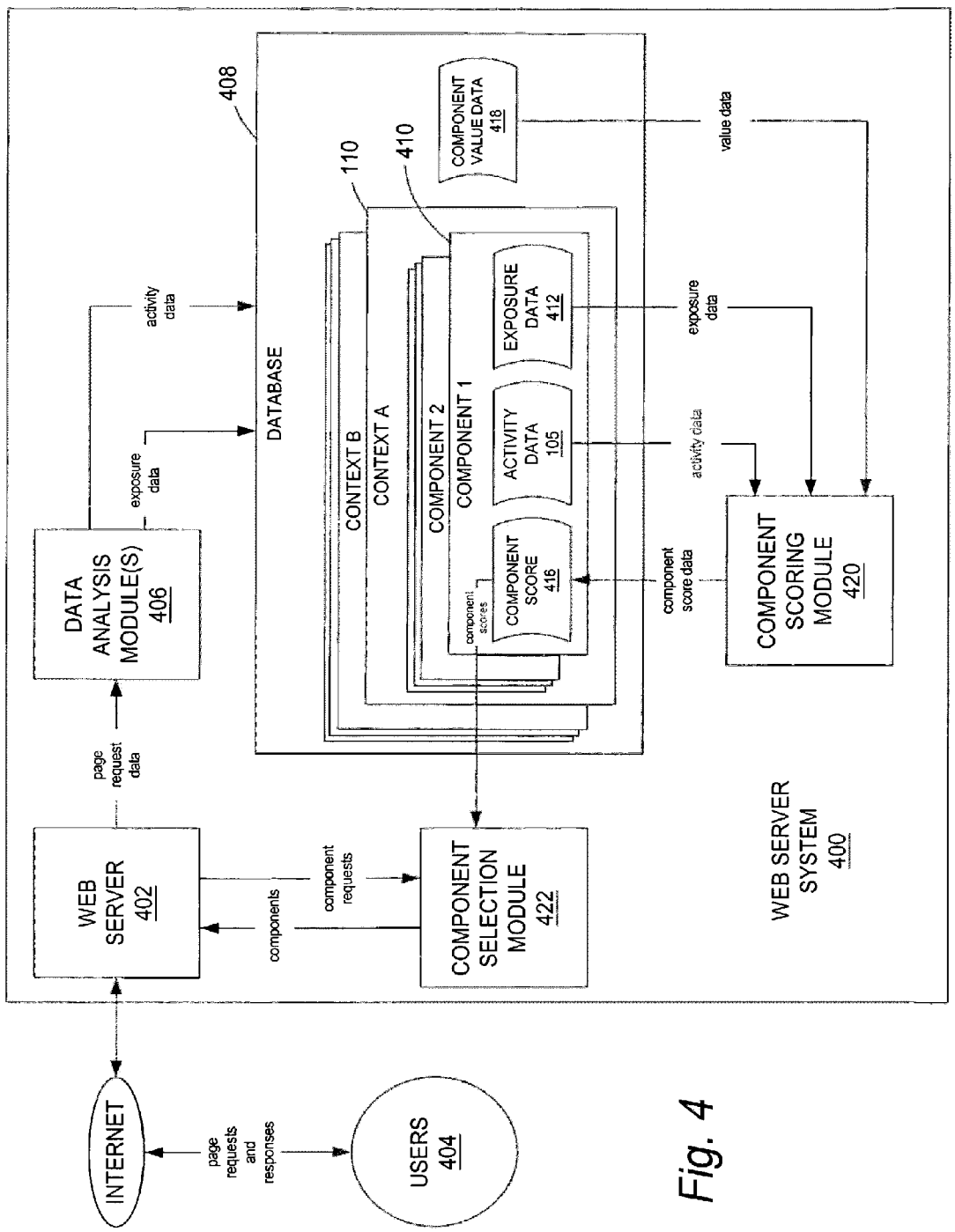
FIG. 4 illustrates a system for selecting subsets of components and serving web pages in accordance with one embodiment.

In this section, a system and methods for optimizing the selection of components for display on a dynamically-generated web page will be described with reference to FIGS. 4, 5 and 6 in accordance with certain embodiments of the invention. FIG. 4 illustrates a system 400 for selecting subsets of components and serving web pages in accordance with one embodiment. Referring to FIG. 4, a web server system 400 includes a web server 402 configured to respond to web page requests of users 404. In response to each page request, the web server 402 serves a web page to the requesting user 404. Some or all of the web pages served by the server 402 include subsets of components selected from larger sets of components.

Figure 5:
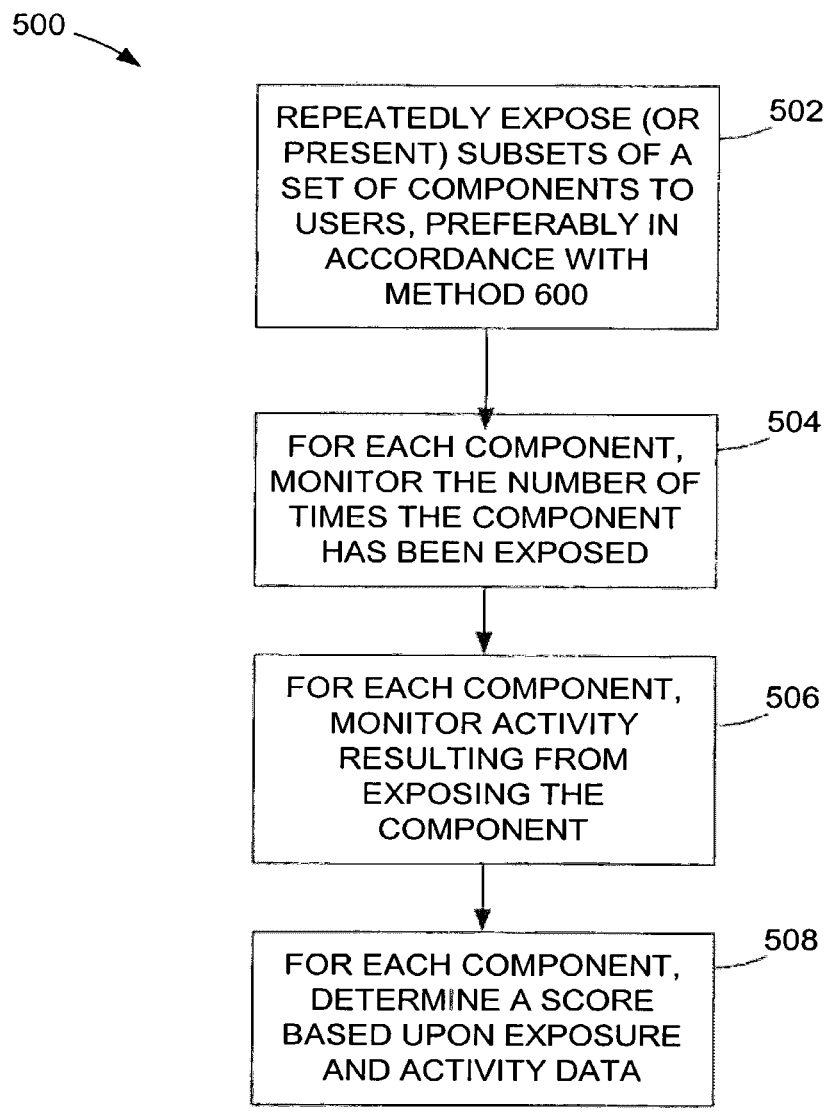
FIG. 5 illustrates a method for determining scores for components based upon which components can be selected in accordance with one embodiment.

FIG. 5 illustrates a method 500 for determining component scores, which are used in selecting subsets, in accordance with one embodiment. The method 500 is preferably performed separately with respect to each context of interest. Referring to FIG. 5, at a step 502, subsets of a set of components are repeatedly exposed (presented) to users. A component is exposed, for example, by inclusion of the component on a web page served to a user. Preferably, the subsets are varied to some extent such that most or all of the components in the set are exposed at least a certain number of times. In response to each web page request that falls within the context of interest, the web server 402 serves pages including subsets of the components in the set, preferably in accordance with the method 600, described below. As a result, over time, the components in the set are repeatedly exposed to users.

At a step 504, for each component in the set, the number of times the component has been exposed is counted or the amount the component has been exposed is monitored. As will be discussed below, different techniques for counting or monitoring exposure can be used.

At a step 506, for each component in the set, user activity related to exposures of each component is monitored. The user activity can include any activity performed by the user with respect to the exposed (displayed) component, such as, for example, traversal of a hypertext link displayed by a component, the addition of a product displayed or represented by a component to a shopping cart, or a mouse-over event detected by an applet associated with the component. As will be discussed below, different techniques for counting or monitoring activity can be used.

Referring to FIG. 4, in order to monitor component exposure and activity, the web server 402 preferably provides a page request log or a page request data stream to a data analysis module 406. The page request log or data stream preferably includes page request data, such as complete URLs, and/or user-related data associated with the users 404 and their browsing sessions. Based upon the page request data, the data analysis module 406 preferably gathers component exposure and activity data, associates the data with its proper context, and updates entries in a database 408.

The database 408 preferably includes entries for one or more contexts 110. For each context 110, data is preferably maintained for each of several components 410, all of which make up a set or list. For each component 410, exposure data 412, activity data 105 and a component score 416 are preferably maintained.

The database 408 preferably also maintains component value data 418 for each component. The value data can represent a value or benefit to an entity operating a web site that results from user activity related to a component. For example, for an on-line merchant, a value for a component can be representative of a margin, profit, or contribution associated with a user's purchase of a product identified by the component. In the illustrated system 400 the value data 418 for each component is not necessarily associated with the context or contexts that include the component. In an alternative embodiment, the component value data is maintained for each component in association with a corresponding context. This value data 418, which will be discussed in greater detail below, can be used in determining a component's activity data 105 or score 416.

At a step 508, for each component in the set, a component scoring module 420 determines a score 416 based upon activity and exposure data for the component. The score 416 can also be based upon value data 418 for the component. The component scoring module 420 preferably stores the score 416 in association with the component 410 and the context 110. As will be discussed below, scores are preferably used in selecting components from sets to be included in subsets.

Figure 6:
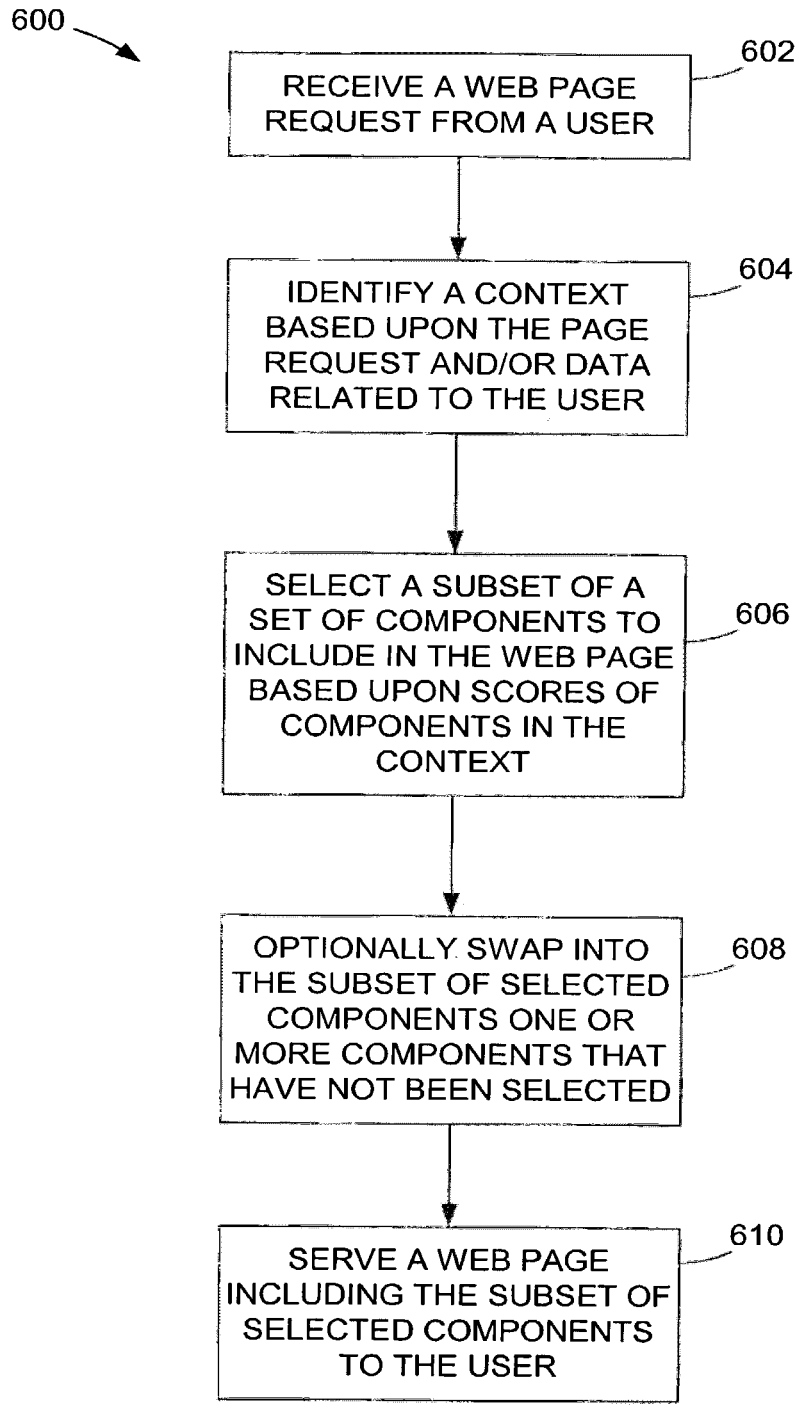
FIG. 6 illustrates a method for selecting components for inclusion on a web page in accordance with one embodiment.

FIG. 6 illustrates a method 600 for responding to a request for a web page by selecting components from a set in accordance with one embodiment. At a step 602 the web server 402 receives a web page request from a user 404. At a step 604, the web server 402 identifies an associated context, which may be based upon the page request, the user's web browsing session and/or data related to the user. The method 600 is preferably invoked in response to certain types of pages that are configured to utilize subsets of components.

At a step 606, in response to a request from the web server 402, a component selection module 422 selects a subset 106 of a set of components 104 associated with the context 110 for inclusion in the web page 108. The subset of components 106 is preferably selected based upon the scores 416 of the components in the context 110. In one embodiment, the subset is selected off-line, in advance of receiving the page request. In this embodiment, the subsets of components for all contexts can be determined periodically and referenced as necessary. In another embodiment, the subset of components is selected dynamically, in response to the web page request.

At a step 608, in one embodiment, the component selection module 422 optionally swaps into the subset 106 one or more components that have not been selected. The swapping of unselected components into the subset 106 provides an opportunity for activity to be measured for components with little or no prior exposure.

At a step 610, the web server 402 receives an identification of the subset of components 106 from the component selection module 422 and includes the subset of components is a web page 108. The web server 402 then serves the web page in response to the user's request.

As will be understood by one skilled in the art some or all of the processes, methods, and modules described herein are performed or implemented by programs or processes executed by one or more general purpose computers.

A. Monitoring Exposure

As discussed above with respect to the step 504, for each component in a set of components for a context of interest, the number of times the component has been exposed is counted or the amount the component has been exposed is monitored. Different techniques can be used to monitor exposure or count exposures. In one embodiment, for example, an absolute count of a number of exposures starting from zero can be maintained beginning from some start date for each component.

In one embodiment, a number of exposures $E_{new}$ is determined for each day (or hour, week, month, etc.). The current exposure value E for a day N is then determined based upon the daily exposure count $E_{new}$, a decay factor d, which is preferably between 0 and 1, and an exposure value for the previous day $E_{N-1}$ as shown in equation (1) below:

$$E = E_{new} + dE_{N-1} \quad (1)$$

In accordance with equation (1), data for each day is taken into account, but the value of the effect of data for any particular day on the value E decays over time. As exposure data is accumulated using equation (1), the value of $E_N$ will continue to grow until $E_{N-1}(1-d)$ becomes as large as $E_{new}$ (at which point the scaling down of $E_{N-1}$ by the factor d is equal to the amount added by $E_{new}$). A typical weighting factor d is approximately 0.99. This provides for a slow decay rate of the significance of historical values. If a faster decay rate is desired, a lower decay factor can be used. For example, if a component offers a seasonal product for sale or if the component offers a product for which a new trend is emerging, a lower decay factor can be used for determining the component's exposure. As will be understood by one skilled in the art, the value of d can be set to 0, in which case past data is discarded altogether and E becomes the most recent daily value of $E_{new}$. The value of d can be set to 1, in which case past data is weighted as heavily as current data and the growth of E becomes effectively unbounded.

As still another alternative, an exponentially moving average, also using a decay factor d, which is preferably between 0 and 1, can be used:

$$E = E_{new}(1-d) + dE_{N-1} \quad (2)$$

As the decay factor is decreased, the historical data decays out of the determination more quickly and new data is given more weight in the determination of E. Exponentially moving averages and their characteristics are well-known and will be familiar to one skilled in the art.

B. Monitoring Activity

As discussed above with respect to step 506, for each component in the set, user activity related to exposures of each component is monitored. As will be understood by one skilled in the art, different kinds and types of user activity can be measured depending upon the application. For an information-related web site, traversals of hypertext links may be the only activity of interest. For an on-line merchant, however, addition of products to a shopping cart, and/or the purchase of products may be actions of interest.

In certain embodiments, multiple types of actions are monitored and weighted in determining a measure of activity. For an on-line merchant, for example, the types of actions tracked might include (a) traversals of component-related links, (b) addition of component-related product(s) to a wish list, and (c) addition of component-related product(s) to an electronic shopping cart. Weighting factors $W_a$, $W_b$, and $W_c$ can be applied, respectively, to the numbers $A_a$, $A_b$, and $A_c$ of each of these types of actions depending upon the actual or estimated value of those actions to the merchant to determine an overall activity value A:

$$A = W_a A_a + W_b A_b + W_c A_c \quad (3)$$

For an on-line merchant, the values of $W_a$, $W_b$, and $W_c$ might be 1, 5, and 10, respectively.

In one embodiment, the activity value A is determined based upon numbers of related user actions counted starting from zero from some start date for each component. Alternatively, decay factors or exponentially moving averages can be used to determine current values for user actions based upon historical data. Preferably, for each component, the same technique (and, if applicable, the same decay factor) is used for determining user activity values and exposure values. As will be understood by one skilled in the art, the decay and exponentially moving average techniques described above can be applied to either the numbers of the different types of actions $A_a$, $A_b$, and $A_c$ or to the overall activity value A. In the case the decay or exponentially moving average techniques are applied to the numbers of the different types of actions, current values for the individual types of actions $A_a$, $A_b$, and $A_c$ are preferably maintained in the database. In the case the decay or exponentially moving average techniques are applied to the overall activity value, a daily activity value can be calculated and combined with a historical activity value to determine a new activity value each day. In this case, only the activity value A needs to be maintained in the database.

In certain embodiments, an activity value can also be based upon component value data 418. As discussed above, component value data can represent a value or benefit to an entity operating a web site that results from user activity related to a component. For example, for an on-line merchant, a value for a component can be representative of a margin, profit, or contribution associated with a user's purchase of a product identified by the component. The value data can be taken into account, for example, by incorporating a value factor V into the activity calculation:

$$A = W_b V A_b + W_c V A_c \quad (4)$$

As used in equation (4), the value factor V can be a relative value representative of expected, actual, or measured margin or profit to an on-line merchant associated with certain actions, such as (b) addition of component-related product(s) to a wish list and (c) addition of component-related product(s) to an electronic shopping cart.

As will be understood by one skilled in the art, equations (3) and (4) are intended only as examples. In other embodiments, different calculations can be used to suit the purposes of the particular application. For example, by combining aspects of equations (3) and (4), an activity calculation can be configured to take value factors into account with respect to some actions but not others.

In certain embodiments, two or more separate activity values can be calculated using different equations and each of the activity values can be maintained in the database 408. As will be discussed below, multiple activity values can be weighted and combined in a score determination.

C. Score Determination

As discussed above with respect to step 508, for each component in a set, a score is determined based upon activity and exposure data for the component. In one embodiment, the score S of a component is determined by dividing the activity value A by the exposure value E:

$$S = \frac{A}{E} \quad (5)$$

In certain embodiments, once all of the scores of the components in a context set are determined, the scores are normalized by dividing each score by the maximum of all of the scores. For example, the score S of a component is divided by a maximum $S_{max}$ of all the scores in the context set to produce a normalized score $S_{normalized}$ for the component.

$$S_{normalized} = \frac{S}{S_{max}} \quad (6)$$

In certain embodiments, multiple scores are determined for each component using multiple activity values. For example, a first score $S_A$ for a component can be based upon a first activity value $A_A$ and a second score $S_B$ for the component can be based on a second activity value $A_B$ using equation (5) above. The multiple scores can be normalized using equation (6) and combined using a weighting factor W' to determine an overall score for each component:

$$S = W'S_{A\text{-}normalized} + (1-W')S_{B\text{-}normalized} \quad (7)$$

In one embodiment, equation (7) is used by an on-line merchant with a weighting factor W' of 0.6. In this embodiment, $S_{A\text{-}normalized}$ is a normalized score based on user actions (a), (b), and (c) referred to above using a form of equation (3):

$$A_A = A_a + 5A_b + 10A_c \quad (3A)$$

$S_{B\text{-}normalized}$ is a normalized score based only on user actions (b) and (c) referred to above using a form of equation (4):

$$A_B = 5VA_b + 10VA_c \quad (4B)$$

D. Context Identification

Figure 7:
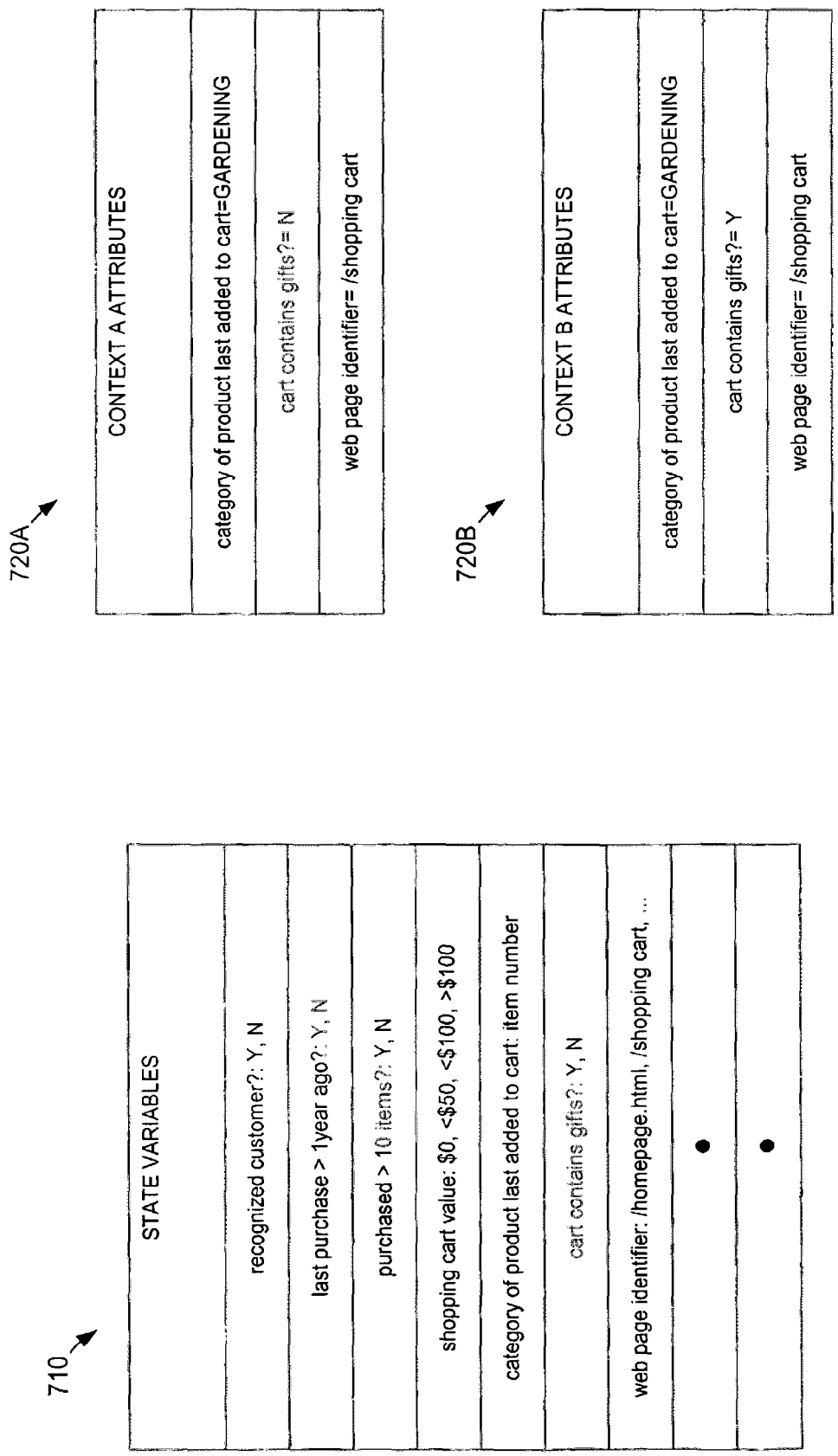
FIG. 7 illustrates an example set of state variables and two sets of example context variables for an on-line merchant.

FIG. 7 illustrates an example set of state variables 710 and two sets of example context attributes 720A-B for an on-line merchant. The state variables 710 contain values related to a user and/or the user's browsing session. The attributes 720A-B define and identify their respective contexts.

The state variables 710, which can be used to store data about the user and/or the user's browsing session are preferably maintained and updated by the web server system 400 for each user. In one embodiment, the state variables 710 are maintained in a user profile (set of user-related data) for each user. Each of a set of example state variables in FIG. 7 is listed by a descriptive name, followed by a range of possible values in parentheses. Some of the state variables are web-browsing session specific, such as the "web page identifier" which is an identifier of the current web page that is being browsed by the user. Other variables, such as the "last purchase >1 year ago?" variable, is not specific to the session, but rather is determined based upon past actions of the user, possibly during previous web browsing sessions.

The context attributes 720A and 720B specify values for the three state variables: "category of product last added to cart," "cart contains gifts?," and "web page identifier." The value of the attribute "cart contains gifts?," however is different for the two contexts A and B and this distinction differentiates the two contexts. Other contexts can include attributes that correspond to other state variables or sets of state variables.

As discussed above with reference to step 604, the web server 402 identifies a context, which may be based upon the page request, the user's web browsing session and/or data related to the user. In accordance with one embodiment, a context is identified by matching current state values for a web browsing session to all of the applicable attribute values for a context. Preferably, context attributes are selected such that only one context will match any set of state variable values.

In one embodiment, values of state variables are coded into bit fields in a binary number and the resulting number defines and identifies the context. For example, for an on-line merchant, attributes can be encoded as bit field elements as follows:

1=recognized customer
    2=last purchase more than 1 year ago
    4=purchased more than 10 components
    8=shopping cart contains more than $100
    16=shopping cart contains between $50 and $100
    32=order contains gift components A customer that has only been a customer for three months, has purchased twelve components in that time, and has a $60 book selected as a gift in his shopping cart will be in the context represented by the number 53. By encoding attributes as bit fields, the context can be easily be determined on the fly by testing each of the aforementioned conditions and adding together the resulting values.

Contexts can be made specific or general depending upon which, how many, and how attributes are specified. A general context, for example, can have a single attribute, such as a web page identifier of a web page of recommended gifts at a merchant web site. A specific context, for example, can take into account more specific attributes, such as, for example, whether the user's shopping cart contains gifts and the category of the product last added to the shopping cart.

E. Selecting a Subset or Sublist

As discussed above with reference to step 606, in response to a request from the web server 402, the component selection module 422 selects a subset 106 of a set of components 104 for inclusion in the web page 108. The subset of components 106 is preferably selected based upon the scores 416 of the components in the context 110.

Preferably, the method 500 has been performed for the context identified in step 604 such that each of the components in the context set has a score. In one embodiment, a subset of N components is selected by selecting the N components with the highest scores in the context set. Alternatively, in the case a list is used, the context list is ordered based upon the scores determined through the method 500. Then, N contiguous components, preferably the first N in the list, are selected as the sublist.

The value of N or the size of the set is preferably determined by the web server 402 based upon the specification, structure or template of the web page into which the selected subset of components is to be incorporated.

F. Swapping Unselected Components into the Subset

As discussed above with reference to step 608, the component selection module 422 optionally swaps into the subset 106 one or more components that have not been selected. The swapping of unselected components into the subset 106 provides an opportunity for activity to be measured for components with little or no prior exposure.

Preferably, in a certain percentage or proportion of instances in which the method 600 is performed for each context, one or more components that were initially selected in step 606 are swapped out of the subset and replaced with components that have not been selected. The selection of the replacement components is preferably random, so as to ensure that over time all of the components in the context set obtain some exposure. Preferably, components are swapped in about 10% to 20% of all cases.

V. Additional Factors

A. Determining Initial Scores

When a new component is introduced to a context set, the component will likely have no exposure data or the exposure value might be 0. If the exposure value is 0, a calculation of the score using equation (5) results in a division by 0 and cannot be used. In these situations, a default score, such as the average of all scores, can be used for the component. An initial score can be chosen automatically or manually. In one embodiment, the initial score can be automatically based on objective criteria, such as current sales rank of a product. In one embodiment, the initial score can be manually chosen based on subjective criteria such as perceived value of the component or expectation of performance.

B. The Root Context

In one embodiment, the database maintains a separate context that includes an aggregation of all of the exposure and activity data for all components in all contexts. This separate context will be referred to as the root context.

In the case a new component is introduced, it may take some time before the component obtains enough exposure such that a statistically significant amount of exposure and activity data is accumulated in each context in which the component is included. Accordingly, until a certain threshold number of exposures is accumulate in a context, the exposure and activity data contained in the root context can be used to calculate a score for the component in other contexts. In a preferred embodiment, the root context is relied upon until a component obtains at least 25 exposures in a context of interest.

When a new context is created, a complete context set of components is effectively introduced and each of the new components can be treated as a new component. Accordingly, in one embodiment, scores for the new components can be based on the root context until each of the components accumulates a statistically significant amount of data within the new context.

In one embodiment, the root context can be used to track performance of components or content in the aggregate. In this aspect, performance in the root context can be used when evaluating whether to remove a poor performer from some or all contexts.

C. Accounting for Low Exposure Numbers

When a new component is introduced to a set of context sets, it may take some time until a statistically significant number of exposures is accumulated in even the root context.

In one embodiment, in order to enable activity data to accumulate more quickly when new components are introduced, the decay factor d, in equation (1) can be set to 1 until a statistically significant number of exposures, such as 25, are obtained.

In certain embodiments, scores based upon larger number of exposures are favored as statistically more reliable. In order to favor these scores, activity values can be adjusted by the number of exposures E in accordance with the following equation before scores are determined:

$$A_{adjusted} = A\left(1 - \frac{1}{\sqrt{E}}\right) \tag{8}$$

Preferably, the minimum number of exposures is 25 and so the most significant adjustment is a multiplication by 0.8.

A more general form of equation (8) is:

$$A_{adjusted} = A\left(1 - \frac{K}{\sqrt{E}}\right) \tag{8A}$$

where K is a non-negative constant, such that $K \leq \sqrt{E}$. As long as the score S is not computed until E is above some threshold, then K can be larger than 1. K can always be smaller than 1. In equation (8A), when K is large, the penalty applied to components with low exposure data is larger. When K is small, there is less penalty and at the extreme of 0, there is no penalty applied.

D. Accounting for Area Occupied by Components on Web Pages

Referring to FIG. 3, the first component on the web page occupies approximately twice as much area on the web page as the subsequent two components. In one embodiment, the area a component occupies on a web page is accounted for by dividing the activity value of the component by the relative area occupied by the component on the web page:

$$A_{size} = \frac{A}{area} \tag{9}$$

The areas can be specified in relative terms such that small integer areas are used. For example, the area of the first component in FIG. 3 can be selected to be 2, while the areas of the second and third components can be selected to be 1. In this embodiment, scores of components are representative of activity per exposure per unit area on a web page.

E. Accounting for Placement of a Component on a Web Page

Oftentimes, web pages are larger in size than can be displayed in a web browser window without scrolling. Experience has shown that components that appear on a web page without requiring a user to scroll down tend to be selected more often that components shown lower down, that require scrolling to be seen. Also, components near the very bottom of the page tend to be selected more often than components near the middle of the page length.

In one embodiment, the value for counting each instance of a component's exposure is divided by a factor that takes into account placement on a web page. For example, exposure of a component near the top of a long web page can be counted as 1.0 exposures, a component near the bottom of a web page can be counted as 0.7 exposures, and a component placed near the middle of a web page can be counted as 0.5 exposures.

In accordance with one embodiment, locations on a web page are scored by placing the same component in different locations on the web page and accumulating activity data related to the different locations. The scores for the different locations, in turn, can be used in determining the values of the locations for the purpose of counting exposures.

F. Alternatives to Swapping Components into a Subset

As discussed above, the step 606 is preferably optionally performed in a portion of all instances in which the method 600 is performed, such as 10% or 20%. The step 606 is preferably performed to enable components that otherwise would not be exposed at all, to obtain some exposure based upon which activity data can be collected.

Figure 8:
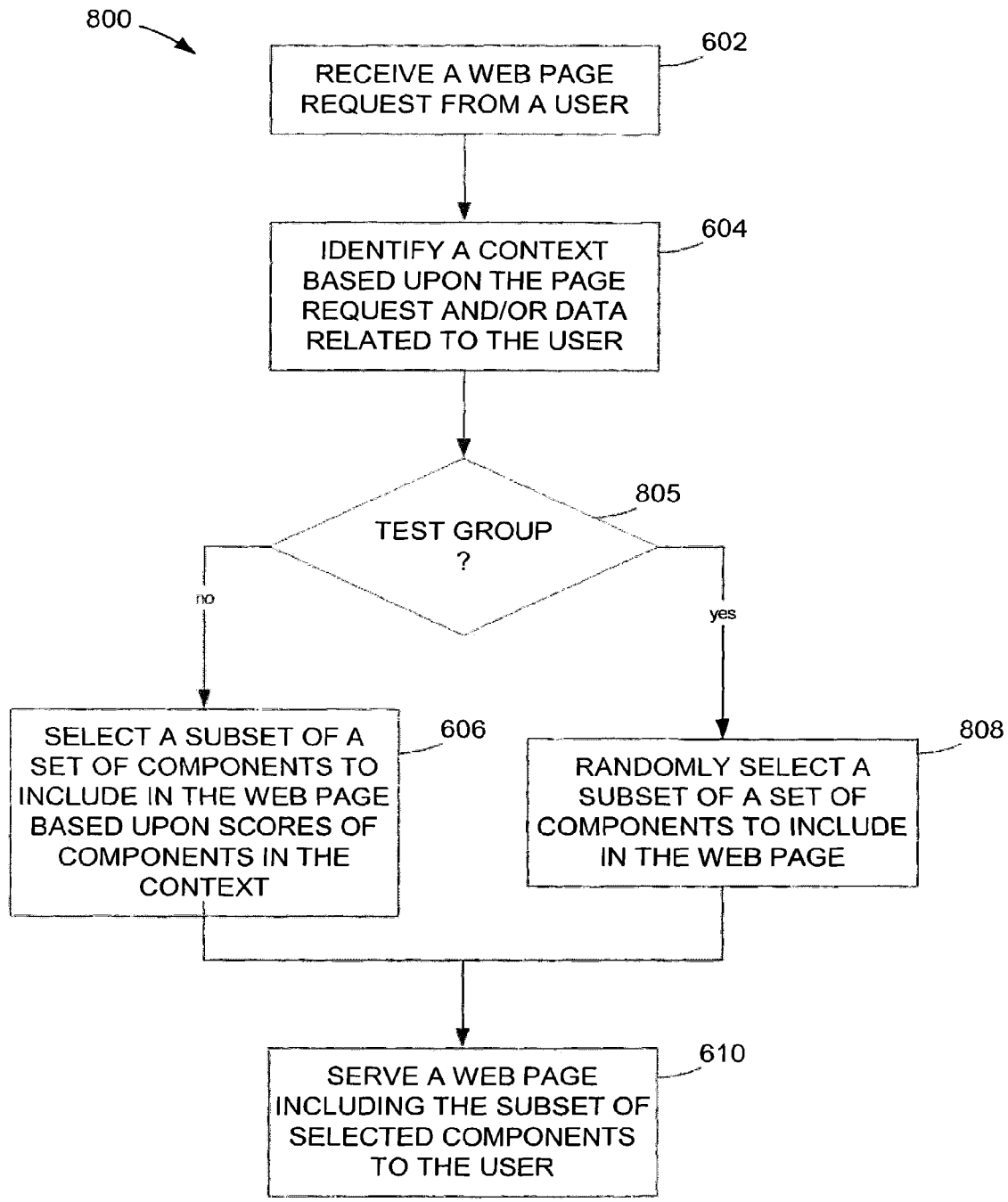
FIG. 8 illustrates an alternative method for selecting subsets of components.

FIG. 8 illustrates an alternative method 800 for selecting subsets of components. The steps 602, 604, 606, and 610 are preferably the same steps described above with reference to the method 600. In the method 800, however, at a step 805 a determination is made as to whether the response to the user's request is to be one of a test group of web pages configured to provide exposure to components that would otherwise not receive exposure. Preferably about 10% to 20% of all web page request are randomly selected to be in the test group. Of those requests that are not chosen to be in the test group, control flows to the step 606 for selection of a subset, preferably in accordance with the description above. Control then flows to the step 610 in which the subset selected in step 606 is included in a web page.

In the case a user's request is chosen to be in a test group, control flows from the step 805 to a step 808. At the step 808, a subset of components is randomly selected from the context set. Control then flows to the step 610 in which the randomly selected set is incorporated into the served web page.

In accordance with one embodiment, in the step 808 the method for randomly selecting the subset is configured to take into account each component's score. The random selection is preferably configured such that the likelihood of a component's being randomly selected is proportional to the component's score. In one embodiment, the step 808 is performed as follows: first, each of a range of numbers is associated with a component of a context set such that the number of numbers associated with each component is proportional to the component's score; second, a random number is selected within the range and the component associated with the random number is selected; third, the selected component is placed in a list or a set of selected components and removed from the set of selectable components; and fourth, the first, second, and third steps are repeated until the desired number of components are selected. As will be understood by one skilled in the art, other techniques are known and can be used for weighting the random selection for components.

In one embodiment, a web browsing session ID of the user requesting the web page is used as a seed for generating the random numbers in the step 808. In this embodiment, therefore, the subset of components is generated dynamically, on-the-fly, in response to the user's request in the step 808. In other embodiments, the randomly selected subsets can be generated off-line, in advance of the user's request based upon a random seed other than the requesting user's web browsing session ID.

G. Selecting Ordering of Components Only

In certain embodiments, a set of components need not be selected and the invention can be used merely to select the order or placement of components on a web page. It may be the case that the set of components to be displayed on a web page has been determined in advance. In these embodiments, activity data can be collected for each of the components and placement of the components on a web page can be based upon component scores.

VI. DYNAMIC SELECTION OF ITEMS

The foregoing methods are also applicable to the selection of items to present within dynamically-generated web pages. The items may, for example, be static product names or descriptions read from a products database.

For example, the invention may be used to vary a set of "related products" displayed on a product detail page of an electronic catalog based on information known about specific users. To do this, a master set of related products may be initially defined for a particular product detail page, and one or more contexts may be defined for that page. The context or contexts may, for example, take into consideration the number or dollar amount of prior purchases made by the users within the product category to which the detail page corresponds. Over time, context-specific activity data may be collected and analyzed for each related product within the master set using the same methods as described above. The results of this analysis may in turn be used to select, on a user-specific basis, a subset of the related products to present on the product detail page.

VII. CONCLUSION

Although the invention has been described in terms of certain embodiments, other embodiments that will be apparent to those of ordinary skill in the art, including embodiments which do not provide all of the features and advantages set forth herein, are also within the scope of this invention. Accordingly, the scope of the invention is defined by the claims that follow. In the claims, the term "based upon" shall include situations in which a factor is taken into account directly and/or indirectly, and possibly in conjunction with other factors, in producing a result or effect. In method claims, reference characters are used for convenience of description only, and do not indicate a particular order for performing a method.

What is claimed is:

1. A computer process for adaptively selecting components to include on dynamically generated electronic pages, the process comprising:

collecting exposure data for exposure events in which a component is included on dynamically generated electronic pages served to requesting devices, the exposure data including positional values reflecting display positions at which the component is included on the dynamically generated pages;

collecting activity data reflective of user interactions with the component as included on the dynamically generated electronic pages, the activity data based on monitored interactions of a plurality of users;

calculating a score for the component based on at least (1) the collected exposure data, including the positional values, and (2) the collected activity data, the score representing an effectiveness of the component;

receiving a page request from a user device; and generating an electronic page to provide to the user device in response to the page request, wherein generating the electronic page comprises determining, based at least partly on the score, whether to include the component on the electronic page;

said process performed by a computing system under control of executable program instructions.

2. The process of claim 1, wherein the positional values are selected such that more exposure credit is given to exposure events in which the component is positioned near the top of a page than to exposure events in which the component is positioned near the bottom of a page.

3. The process of claim 1, wherein the process comprises:
collecting the exposure data and activity data separately for each of a plurality of defined contexts in which the component is capable of being displayed; and
calculating a respective context-specific score for each of the plurality of contexts based on the exposure and activity data corresponding to the respective context.

4. The process of claim 3, wherein generating the electronic page comprises determining a context of the page request, said context being dependent upon a user attribute associated with the user device, and looking up the context-specific score corresponding to the determined context.

5. The process of claim 4, wherein the context is additionally dependent upon a past browsing history of a user of the user device.

6. The process of claim 1, wherein the component is a dynamically generated component that displays content that depends upon a context in which the component is displayed.

7. The process of claim 1, wherein generating the electronic page comprises using a random selection algorithm in which a likelihood that the page component is selected for inclusion on the electronic page is dependent on the score.

8. A system for selecting components to include on dynamically generated pages, the system comprising:
a plurality of page components represented in computer storage;
a data repository of exposure data reflective of exposure events in which the page components are selected for inclusion on dynamically generated pages, the exposure data including positional values reflective of positions at which the components are included on the dynamically generated pages;
a data repository of activity data reflective of user interactions with the page components as included on the pages, the activity data based on monitored interactions of a plurality of users; and
a computer system programmed with executable instructions to calculate, for each page component, a score representing an effectiveness of the respective page component, the scores based on the exposure data, including the positional values, and based additionally on the activity data.

9. The system of claim 8, further comprising a component selection module that uses the scores to dynamically select the page components to include on pages in response to requests from user devices.

10. The system of claim 9, wherein the component selection module uses a random selection algorithm in which a likelihood that a page component will be selected for inclusion on a requested page depends on the score corresponding to the component.

11. The system of claim 8, wherein the exposure data and activity data are stored separately for each of a plurality of defined contexts in which page components can be displayed, and wherein the computer system is programmed to calculate, for a page component, a plurality of context-specific scores, each of which represents an effectiveness of the page component within a respective context.

12. The system of claim 8, further comprising a plurality of context definitions stored in computer storage, each context definition defining a different respective one of the plurality of contexts, wherein at least some of the context definitions include user attribute values.

13. The system of claim 8, wherein at least one of the page components displays content that is dependent upon a context in which the component is displayed.

14. A computer-implemented method of selecting components to include on dynamically generated pages, the method comprising:
receiving, from a user computing device of a user, a request for a dynamically generated page;
mapping the request to a context defined in computer storage, said context being one of a plurality of defined contexts in which the page is capable of being requested;
for each of a plurality of candidate components, determining a respective context-specific score that reflects an effectiveness of the candidate component in the context, wherein each score is dependent upon responses of prior users to presentation of the respective component in the context;
selecting, based at least in part on the scores, a subset of said plurality of candidate components to present to the user on the page; and
dynamically generating the page in response to the request, wherein dynamically generating the page comprises incorporating the selected subset of components into the page;
the method performed programmatically by a computing system that comprises a server.

15. The method of claim 14, wherein mapping the request to a context comprises selecting the context based at least partly on an attribute of the user.

16. The method of claim 15, wherein mapping the request to a context comprises selecting the context based additionally on a state of a browsing session of the user.

17. The method of claim 14, wherein the scores dependent upon display positions at which the components were presented to the prior users on pages.

18. The method of claim 14, wherein the component displays dynamically selected content that depends on the context, and the method further comprises dynamically selecting the content in response to the request.

19. The method of claim 14, wherein the subset of candidate components is selected based additionally on a randomization function.

* * * * *